United States Patent Office 3,234,169
Patented Feb. 8, 1966

3,234,169
DENTAL RESTORATION COMPOSITION
George J. Taub, % George Taub, Inc.,
2824 Hudson Blvd., Jersey City 6, N.J.
No Drawing. Filed Feb. 28, 1963, Ser. No. 261,840
9 Claims. (Cl. 260—31.8)

This invention relates to plastic dental restorations and more particularly to a composition of matter useful in making such restorations. The composition comprises a mixture of a monomer liquid and a polymer powder which when heated under pressure in a mold of the desired configuration polymerizes to form a dental restoration having excellent resistance to abrasion, little tendency to absorb moisture, high density, excellent dimensional stability and a life-like lustre.

Dental restorations are commonly prepared by first making a wax model of the tooth or teeth being restored and then using this wax model to make a two-piece plaster or stone mold of the restoration. After the plaster or stone has thoroughly hardened, the wax is removed from the mold and the mold cavity is packed with the material from which the dental restoration is to be made. The material employed for dental restorations commonly comprises a mixture of a monomer liquid (e.g., methyl methacrylate) and a polymer powder (e.g., powdered poly(methyl methacrylate)), the monomer liquid being polymerizable so that when the mixture is packed into the mold and then is heated under pressure, a solid plastic dental restoration is produced. The plastic compositions heretofore employed form acceptable dental restorations but leave something to be desired with regard to their resistance to abrasion, absorption of moisture, dimensional stability and other physical properties.

I have now discovered an improved dental restoration composition which forms plastic restorations having greater resistance to abrasion, less tendency to absorb moisture, greater density, and greater dimensional stability than any heretofore produced. My improved dental restoration composition comprises a mixture of a new monomer liquid component composition and a polymer powder component composition. The monomer liquid composition of my invention comprises a solution containing about 1000 parts of monomeric methyl methacrylate, between about 10 and 100 parts of at least one vinyl polymer that is soluble in methyl methacrylate and is selected from the group consisting of homopolymers of vinyl chloride and copolymers of vinyl chloride and vinyl acetate, between about 20 and 200 parts of acrylonitrile, and between about 3 and 60 parts of a plasticizer for the vinyl polymers. The polymer powder composition comprises essentially powdered poly(methyl methacrylate). Preferably, the amount of the plasticizer in the monomer liquid composition does not exceed the amount of the vinyl polymer therein and the amount of the vinyl polymer does not exceed the amount of acrylonitrile present in the composition. Moreover, the monomer liquid composition advantageously includes a minor amount of a cross-linking agent for the methyl methacrylate constituent thereof, a small amount of an inhibitor to prevent premature polymerization of the methyl methacrylate and, for certain applications, a polymerization catalyst for this constituent material.

The methyl methacrylate employed in my monomer liquid composition should be monomeric or at most should have a low degree of polymerization so that this constituent is a free-flowing polymerizable liquid miscible with or capable of dissolving the acrylonitrile, vinyl polymers and plasticizers employed in the composition. Substantially monomeric methyl methacrylate is obtainable from commercial sources ordinarily without a cross-linking agent admixed therewith. However, I presently prefer to employ methyl methacrylate to which a cross-linking agent has been added, although use of such agents is not essential in the practice of my invention. The cross-linking agents commonly used in admixture with methyl methacrylate include: ethylene dimethacrylate, triethyleneglycol dimethacrylate, tetraethylene glycol dimethacrylate, vinyl methacrylate, divinyl benzine, allyl acrylate, allyl methacrylate, calcium acrylate, and diallyl sebacate.

As previously noted, the vinyl polymers employed in the monomer liquid composition must be soluble in the methyl methylcrylate solution, and I have obtained particularly satisfactory results by using a vinyl chloride vinyl acetate copolymer containing about 90% by weight of vinyl chloride; one such copolymer is manufactured by the Bakelite Company under the designation "VYNS." Other thermoplastic vinyl resins used in my monomer liquid composition are homopolymers of vinyl chloride and copolymers of vinyl chloride and vinyl acetate containing between 85 and 92% by weight of vinyl chloride, the vinyl resins designated "VMCH," "VYHH" and "VYLE" by the Bakelite Company being particularly satisfactory for this purpose. I have found that when the amount of the vinyl polymer added to the monomer liquid is less than about 10 parts of polymer to about 1000 parts of methyl methacrylate the dental restoration produced therefrom lacks the life-like lustre that is characteristic of dental restorations made in accordance with my invention which contain a greater proportion of vinyl polymers, whereas an amount of vinyl polymers in excess of about 100 parts of polymer to about 1000 parts of methyl methacrylate results in a monomer liquid composition that is to viscous for use in making dental restoration in accordance with my invention.

The amount of acrylonitrile present in the monomer liquid is not critical within wide limits, and I have successfully produced dental restorations in accordance with my invention by the use of monomer liquids containing as little as about 20 and as much as about 200 parts of acrylonitrile per 1000 parts methyl methacrylate. However, I presently prefer to employ approximately twice the amount of acrylonitrile as the amount of vinyl polymer in the monomer liquid composition.

As in the case of acryonitrile, the amount of plasticizer for the vinyl polymer present in the monomer liquid composition may vary within wide limits, and I have successfully produced dental restorations in accordance with my invention with monomer liquids containing as little as about 3 parts and as much as about 60 parts of plasticizer per 1000 parts of methyl methacrylate. However, I presently prefer to employ about half the amount of plasticizer as the amount of vinyl polymer present in the monomer liquid composition. As a general rule, any plasticizer capable of wetting, dissolving or swelling the specific vinyl polymer employed in my liquid monomer composition may be used in formulating the composition. Such plasticizers must, of course, be compatible (i.e., miscible) with the other constituents of the monomer liquid and should be non-toxic and non-irritating to oral tissues. Among the plasticizers which have been used are dialkyl phthalates, phosphates, sebacates, adipates, succinates, riconoleates, butyrates, hexoates, and glycollates. In addition, several polymeric plasticizers, such as the polyacrylates, have been found suitable. In particular, I have found dioctyl phthalate to be particularly satisfactory for use in my dental restoration composition.

The monomer liquid component of my dental restoration composition is prepared by dissolving the vinyl polymer constituent in the methyl methacrylate constituent of the composition to obtain a syrupy liquid. To dissolve the vinyl polymer in the liquid monomer, the polymer powder is added slowly to the liquid monomer with constant agitation, the polymer becoming completely dissolved in the liquid within a few minutes or after several hours of agitation depending upon the rate of solution of the powder in the liquid. The other liquid constituents of the monomer liquid composition—namely, acrylonitrile and the plasticizer for the vinyl polymer—are then added to and thoroughly blended with the syrupy solution or, alternatively, the acrylonitrile and the plasticizer constituents can be added to the methyl methacrylate constituent prior to dissolving the vinyl polymer constituent in the mixture of liquid monomers. A conventional polymerization inhibitor is also advantageously added to the liquid composition to inhibit the polymerization of the methacrylate constituent thereof at room temperatures, thereby extending the shelf life of the composition indefinitely. Moreover, the monomer liquid composition may be modified so that it can be used as one of the components of a tooth-filling composition. In this application of the composition conventional polymerization catalysts are added both to the monomer liquid and to the polymer powder so that when the two components are mixed together the resulting filling composition will polymerize and harden at the relatively low temperatures encountered in the mouth.

The polymer powder component of my dental restoration composition comprises a dry powder of poly(methyl methacrylate) of the kind well known to those skilled in the dental restoration art. These powders are obtainable from commercial suppliers in a variety of shades of color, and the particular polymer powder formulation employed in an individual restoration is that powder which is closest in color to the color of the natural teeth of the individual dental patient. Moreover, fluorescent pigments can be added to the polymer powder in order to give the dental restoration made therefrom an especially lifelike luster or luminescence.

To prepare the dental restoration composition from the liquid and powder components thereof, an amount of the monomer liquid component is added to and thoroughly mixed with the polymer powder component so that the resulting mixture contains between about 5 and 20%, and preferably between about 8 to 12%, by weight of the liquid component. Insufficient monomer liquid in the mixture results in a dental restoration having imperfections, such as dry powder inclusions, therein, whereas an excessive amount of the monomer liquid dilutes the shade of the polymer powder and may result in a restoration lacking in the desired degree of hardness. In practice, the amount of the polymer liquid added to the polymer powder is just sufficient to wet the powder without flooding the powder or obtaining a mixture having a soupy or runny consistency.

To prepare a dental restoration employing my new composition, a two-piece mold having a mold cavity of the desired shape is prepared in the usual manner; for example, a wax model of the tooth or teeth to be restored is formed, and this model is then employed as the pattern in the preparation of a two-piece plaster of Paris or poured stone mold. A small quantity of the two component composition is prepared as previously described and the composition mixture is packed into the mold cavity in the usual manner. The two halves of the mold are then clamped together and the mold is placed in hot or boiling water or in an oven where it is heated for sufficient time to polymerize the polymerizable constituent of the composition. The length of time that the mold with the composiion therein must be heated to cure the plastic materials depends upon the curing temperature. For example, the material can be cured by immersing the mold in hot water at a temperature from about 160° to 212° F. for a period of about three hours to 45 minutes, or it can be cured by placing the mold in an electric oven at a temperature ranging from 250° to 450° F. for a period ranging from 45 minutes to about 25 minutes, depending on the temperature. At the end of the heating operation, the mold is removed from the hot water or oven and is allowed to cool to room temperature, or is plunged in cold water to cool the mold, whereupon the mold is opened and the cured plastic dental restoration removed therefrom. After trimming flash from the molded plastic restoration and polishing the restoration to obtain a lifelike lustre, the restoration is ready for use. The plastic dental restoration thus produced has greater resistance to abrasion, less tendency to absorb moisture, greater density, greater dimensional stability, and a more lifelike lustre than plastic dental reproductions produced by the use of the monomer liquid compositions heretofore employed in this art.

The following specific examples are illustrative but not limitative of the practice of my invention.

*Example I*

A monomer liquid composition was prepared by dissolving 70 grams of a copolymer of vinyl chloride and vinyl acetate containing about 90% by weight of vinyl chloride (designated "VYNS" by the Bakelite Company) in 1000 cc. of methyl methacrylate monomer to which a small quantity of a cross-linking agent had been added. To the resulting syrupy solution of vinyl polymer and methyl methacrylate monomer was added 150 cc. of acrylonitrile and 40 cc. of dioctyl phthalate. The resulting monomer liquid composition was then added to a conventional polymer powder of poly(methyl methacrylate), the amount of monomer liquid added to the polymer powder being just sufficient to completely wet the powder. The resulting mixture was then packed in a conventional two-piece plaster of Paris mold and was cured by immersing the mold in boiling water for a period of about one hour. After the mold was cooled to room temperature by plunging it in cold water, the plastic dental restoration was removed from the mold, flash trimmed therefrom and the restoration polished in the usual manner. The resulting restoration was superior in all respects to plastic restorations produced by the use of the plastic compositions heretofore known in the art.

*Example II*

A monomer liquid composition comprising 1000 cc. of methyl methacrylate (MMM), 90 grams of vinyl polymer (VYNS), 160 cc. of acrylonitrile (ACN) and 50 cc. of dioctyl phthalate (DOP) was prepared as described in Example I. The resulting monomer liquid composition was almost too syrupy or viscous for ready mixing with the polymer powder composition, although after the two components of the dental restoration composition were mixed together a satisfactory restoration was produced therefrom in the manner described in Example I.

Example III

A monomer liquid composition containing 1000 cc. of methyl methacrylate (MMM), 10 grams of vinyl polymer (VYNS), 100 cc. of acrylonitrile (ACN), and 40 cc. of dioctyl phthalate (DOP) was prepared as in Example I, and this composition was used to make a dental restoration as described in Example I. The resulting dental restoration was satisfactory but lacked the gloss and life-like lustre characteristic of restorations prepared from my monomer liquid compositions containing a great proportion of vinyl polymers.

Example IV

Five monomer liquid compositions having the compositions indicated in the following table were prepared as described in Example I:

|   | MMM cc. | VYNS, gm. | ACN, cc. | DOP, cc. |
|---|---|---|---|---|
| 1 | *1,000 | 20 | 40 | 10 |
| 2 | *1,000 | 30 | 50 | 15 |
| 3 | *1,000 | 40 | 60 | 20 |
| 4 | 1,000 | 50 | 80 | 40 |
| 5 | *1,000 | 25 | 50 | 3 |

* Contained cross-linking agent.

All of these monomer liquid compositions resulted in superior dental restorations when processed in the manner described in Example I.

Example V

A number of monomer liquid compositions were prepared as described in Example I, each composition containing a different plasticizer for the vinyl polymer constituent thereof, including dialkyl phthalate, dialkyl phosphate, dialkyl sebacate, dialkyl butyrate, etc. In all cases the monomer liquid composition thus obtained produced superior dental restorations when processed as described in Example I.

Example VI

A number of monomer liquid compositions were prepared as in Example I, each composition containing a different copolymer of vinyl chloride and vinyl acetate (namely, the copolymers of VCl and VAc designated as VMCH, VYHH and VYLE by the Bakelite Company). All of these vinyl polymers dissolved in the monomer liquid and the resulting monomer liquid compositions produced superior dental restorations when processed in accordance with Example I.

Example VII

A number of different vinyl polymers (namely, the vinyl polymers designated VYNW, NV$_4$, VYNV and VYDR by the Bakelite Company) were tested but did not dissolve to a sufficient extent, if at all, in methyl methacrylate to be of use in my monomer liquid composition.

From the foregoing description of my new monomer liquid composition and the dental restorations produced therefrom it will be apparent that I have made an important contribution to the art to which my invention relates.

I claim:

1. Dental restoration composition consisting essentially of a mixture of a monomer liquid component composition and a polymer powder component composition, the amount of said monomer liquid component composition present in said mixture being between about 5% to 20% by weight of the polymer powder component composition content thereof, said monomer liquid component composition consisting essentially of about 1000 parts of monomeric methyl methacrylate, between about 10 and 100 parts of at least one vinyl polymer that is soluble in methyl methacrylate and is selected from the group consisting of homopolymers of vinyl chloride and copolymers of vinyl chloride and vinyl acetate, between about 20 and 200 parts of acrylonitrile, and between about 3 and 60 parts of a plasticizer for said vinyl polymer, and said polymer powder component composition consisting essentially of powdered poly(methyl methacrylate).

2. The dental restoration composition according to claim 1 in which the monomer liquid component composition contains a cross-linking agent for the methyl methacrylate constituent of the composition.

3. Dental restoration composition consisting essentially of a mixture of a monomer liquid component composition and a polymer powder component composition, the amount of said monomer liquid component composition present in said mixture being between about 5% and 20% by weight of the polymer powder component composition content thereof, said monomer liquid component composition consisting essentially of about 1000 parts of monomeric methyl methacrylate, between about 10 and 100 parts of at least one vinyl polymer that is soluble in methyl methacrylate and is selected from the group consisting of homopolymers of vinyl chloride and copolymers of vinyl chloride and vinyl acetate, between about 20 and 200 parts of acrylonitrile, and between about 3 and 60 parts of a plasticizer for said vinyl polymer, the amount of said plasticizer not exceeding the amount of said vinyl polymer and the amount of said vinyl polymer not exceeding the amount of said acrylonitrile present in the liquid component of the composition, and said polymer powder component composition consisting essentially of powdered poly(methyl methacrylate).

4. The dental restoration composition according to claim 3 in which the monomer liquid component composition contains a cross-linking agent for the methyl methacrylate constituent of the composition.

5. Dental restoration composition consisting essentially of a mixture of a monomer liquid component composition and a polymer powder component composition, the amount of said monomer liquid component composition present in said mixture being between about 5% and 20% by weight of the polymer powder component composition content thereof, said monomer liquid component composition consisting essentially of about 1000 parts of monomeric methyl methacrylate, between about 10 and 100 parts of at least one vinyl polymer that is soluble in methyl methacrylate and is selected from the group consisting of homopolymers of vinyl chloride and copolymers of vinyl chloride and vinyl acetate, between about 20 and 200 parts of acrylonitrile, and between about 3 and 60 parts of a plasticizer for said vinyl polymer, the amount of said plasticizer being about one-half the amount of said vinyl polymer and the amount of said vinyl polymer being about one-half the amount of said acrylonitrile present in the liquid component of the composition, and said polymer powder component composition consisting essentially of powdered poly(methyl methacrylate).

6. The dental restoration composition according to claim 5 in which the monomer liquid component composition contains a cross-linking agent for the methyl methacrylate constituent of the composition.

7. A monomer liquid composition for use in a dental restoration composition, said monomer liquid composition consisting essentially of about 1000 parts of monomeric methyl methacrylate, between about 10 and 100 parts of at least one vinyl polymer that is soluble in methyl methacrylate and is selected from the group consisting of homopolymers of vinyl chloride and copolymers of vinyl chloride and vinyl acetate, between about 20 and 200 parts of acrylonitrile, and between about 3 and 60 parts of a plasticizer for said vinyl polymer.

8. The monomer liquid composition according to claim 7 in which the amount of said plasticizer does not exceed the amount of said vinyl polymer and the amount of said vinyl polymer does not exceed the amount of said acrylonitrile present in the liquid component of the composition.

9. The monomer liquid composition according to claim 7 in which is present a cross-linking agent for the methyl methacrylate constituent of the composition.

References Cited by the Examiner

UNITED STATES PATENTS

| 2,463,551 | 3/1949 | Myerson et al. | 106—35 |
| 2,576,944 | 12/1951 | Joy | 260—45.5 |

MORRIS LIEBMAN, *Primary Examiner.*